Patented Nov. 1, 1938

2,135,458

UNITED STATES PATENT OFFICE 2,135,458

SEPARATION OF CONSTITUENTS FROM ORGANIC COMPLEXES

Raymond F. Schultz, Wilmington, Del., assignor to E. I. du Pont de Nemours & Company, Wilmington, Del., a corporation of Delaware No Drawing. Application December 13, 1935, Serial No. 54,351

12 Claims. (Cl. 260—478)

This invention relates to a process for the separation of complexes into their constituents and more particularly to a process for the recovery from complexes, formed between organic compounds and boron halogen containing compounds, the boron-halogen-containing and organic constituents.

An object of the present invention is to provide a process for the separation of constituents from complexes containing the same. Another object of the invention is to provide a process whereby complexes containing an organic constituent and a boron-halogen-containing constituent can be separated into the organic constituent and the boron-halogen-containing constituent. A further object of the invention is to provide a process whereby a complex containing an organic constituent and a boron-halide-constituent can be freed of the organic compound by the addition of a metal halide. A more specific object of the invention is to provide a process wherein complexes containing boron fluoride and an organic acid, ester, or ether may be so treated that the organic acid, ester, or ether is freed from the complex and recovered, the boron fluoride likewise being recovered for reuse. Other objects and advantages of the invention will hereinafter appear.

I have found that if a complex, such as those containing an organic and an inorganic constituent, is treated with a metal halide the organic constituent will be set free and leave a complex formed between the metal halide and the inorganic constituent, (should the inorganic portion of the complex be a metal halide the added metal halide should be a different metal halide). Moreover, if alkaline earth metal halides are employed, to decompose complexes containing a boron halide, the alkaline earth metal halide-boron halide complex formed will, upon heating, give up the boron halide it contains leaving the alkaline earth halide as a residue. Accordingly, when employing alkaline earth metal halides it is possible to recover, from complexes containing an organic and a boron-halogen-containing constituent the organic constituent and the boron-halogen-containing constituent.

Generally, the separation is effected in the following manner; a metal halide is added to the complex containing both an organic and inorganic constituent and apparently due to the fact that the inorganic portion thereof reacts more readily with the metal halide than does the organic portion, the former forms preferentially a metal halide-inorganic complex freeing the organic constituent which may be removed from the resulting mixture by distillation, extraction, absorption, or other means. After the removal of the organic compound there remains the metal halide-inorganic compound complex. If, the metal halide employed is an alkaline earth metal halide or calcium oxide and the inorganic component of the complex originally treated is volatile, as is boron fluoride, such complexes can be broken up by heating thereby driving off the volatile inorganic component.

The metal halides which have been found particularly well adapted for replacing organic compounds from complex-compounds containing the organic compound and a boron-halogen-containing compound include, for example, calcium fluoride, zinc chloride, aluminum fluoride, aluminum chloride, cuprous chloride, lead chloride, iron chloride, tin chloride, calcium chloride, barium chloride, and analogous metal fluorides, chlorides, bromides and iodides. While metal halides will replace the organic constituent of a complex-compound containing an organic constituent and an inorganic constituent, such as boron trifluoride, I have further found that the alkaline earth halides and more especially the alkaline earth fluorides form a complex with the boron fluoride from which the boron fluoride or other analogous easily volatilized halogen-containing compounds may be recovered by heating. Together with the alkaline earth halides such, for example, as the fluorides, chlorides, and bromides of calcium, barium or strontium,—calcium oxide likewise has the ability to not only displace the organic component of a complex containing boron fluoride giving a second complex containing boron fluoride and calcium oxide but to permit the recovery of the boron fluoride from this complex.

The advantages resulting from my process are readily appreciated when it is realized that when using, for example, boron fluoride in condensation reactions, generally, it has been necessary heretofore to destroy the boron fluoride complex by passing it into water or a water-ice mixture prior to recovery of the reaction products. Naturally the boron fluoride is hydrated by such treatment and must be again dehydrated prior to reuse and the product is greatly diluted. In accord with my process, on the other hand, boron fluoride and the product are recovered in a substantially anhydrous condition and the expensive dehydration and concentration steps heretofore required are entirely eliminated.

I shall now illustrate by way of examples methods of separating various organic complexes into their constituents but it will be distinctly understood that the invention shall not be limited specifically thereto.

Example 1.—188 grams of $(CH_3COOH)_2.BF_3$ (1 mol) was treated with 45 grams $CaF_2$ (.58 mol) in a flask attached to a short fractionation column. The mixture was heated in an oil bath to not more than 250° C., during which the acetic acid distilled out. About 117 grams glacial acetic acid was obtained, which is 97.5% of that theoretically possible. This distillation can be effected at atmospheric or reduced pressures.

Subsequent heating of the solid residue, which consists mainly of $Ca(BF_4)_2$, to temperatures between 300° C., and 500° C., resulted in the evolution of boron fluoride according to the equation:

$$Ca(BF_4)_2 \rightarrow CaF_2 + 2BF_3$$

Approximately 58.5 grams boron fluoride was recovered, which is 86.5% of theoretical. Temperatures below and above those given may be used but the range given is preferred.

Example 2.—94 grams of $(CH_3COOH)_2.BF_3$ (.5 mol) was treated with 25 grams NaF (.6 mol) in a flask attached to a short fractionation column. The mixture was heated in an oil bath to not more than 250° C., during which time glacial acetic acid distilled over. About 43 grams of acetic acid was recovered, which is 76% of that theoretically possible. The distillation can be done at atmospheric or reduced pressures. The $BF_3$ can be recovered by heating the solid, which consists mainly of $NaBF_4$, to higher temperatures.

Example 3.—About 94 grams $(CH_3COOH)_2.BF_3$ (.5 mol) was treated with 60 grams NaCl (1 mol) in a flask attached to a short fractionating column. The mixture was heated in an oil bath to not more than 250° C., and about 40 grams of essentially glacial acetic acid distilled over. This was about 67% of theoretical. The distillation can be carried out at atmospheric or reduced pressures.

The boron fluoride can be separated from the solid residue ($NaCl.BF_3$) by further heating to from 300–500° C.

My process is particularly well adapted for use in the separation of addition compounds containing an organic constituent and an inorganic constituent and more particularly such addition compounds in which the inorganic constituent is a relatively highly volatile halide such, for example, as the fluorides, chlorides, bromides, and iodides of boron, but it is likewise particularly useful in the separation of organic containing complexes generally, in which the metal halides preferentially replace the organic compound from its complex with the inorganic halide, among such compounds are included, for example, the aliphatic acid-boron fluoride complexes, e. g., $(CH_3COOH)_x.BF_3$, $(CH_3CH_2COOH)_x.BF_3$,
$CH_3(CH_2)_x.COOH_x.BF_3$ aliphatic ether-boron fluoride complexes, e. g., $(CH_3)_2O_x.BF_3$, $(C_2H_5)_2O_x.BF_3$ etc., ($x$ indicates any integer or fraction), aliphatic ester-boron fluoride complexes, aliphatic alcohol-boron fluoride complexes and more specifically the complexes formed between boron fluoride and methanol, ethanol, propanol, butanol, isobutanol and higher alcohols. Calcium fluoride is particularly well adapted to separate not only the organic acid-boron fluoride complex into the organic acid and a complex containing calcium fluoride and boron trifluoride, but to separate also the latter complex upon heating into boron fluoride and calcium fluoride. It will be appreciated that when employing boron fluoride as a condensing agent in organic acid reactions the use of calcium fluoride is particularly useful for the reason that the condensing agent can be entirely recovered and used over and over again the sole loss in catalyst occurring from usual physical operating causes rather than from loss due to by-product formation.

While my invention has been described with particular reference to complex compounds which contain a boron halide it may likewise be employed to free the organic constituent from its complex with other halides such, for example, as the aluminum halides, tin halides, titanium halides, silicon halides, sulfur halides and analogous halides which form complexes. For use in the second step of my process viz., the separation into its constituents of the wholly inorganic complex, one of the halides should be more volatile than the other, unless extraction or absorption methods are used for recovering one or the other constituent.

From a consideration of the above specification it will be appreciated that many changes may be made in the process herein described without departing from the scope of the invention or sacrificing any of the advantages that may be derived therefrom.

I claim:

1. In a process of separating an organic compound from its complex with a boron halide the steps which comprise adding an alkaline earth metal halide thereto whereupon the organic constituent is freed from the boron halide and an alkaline earth metal halide-boron halide is formed, separating the organic constituent, and subsequently separating the boron halide from the alkaline earth halide-boron halide complex.

2. In a process of separating methyl acetate from its complex with boron fluoride the steps which comprise adding calcium fluoride to the complex, separating methyl acetate from the resulting mixture by distillation, heating the residue containing the calcium fluoride-boron fluoride complex and collecting the boron fluoride driven off.

3. In a process of separating acetic acid from its complex with boron fluoride the steps which comprise adding calcium fluoride to the complex, separating acetic acid from the resulting mixture by distillation, heating the residue containing the calcium fluoride-boron fluoride complex and collecting the boron fluoride driven off.

4. In a process of separating propionic acid from its complex with boron fluoride the steps which comprise adding calcium fluoride to the complex, separating propionic acid from the resulting mixture by distillation, heating the residue containing the calcium fluoride-boron fluoride complex and collecting the boron fluoride driven off.

5. A process for the separation of acetic acid from its association with boron fluoride which comprises treating approximately 1 mol of a complex, containing approximately two mols of acetic acid and one mol of boron fluoride, with approximately .58 mol of calcium fluoride, distilling the resulting mixture to drive off the acetic acid, and subsequently heating the residue between a temperature of 300° C., to 500° C., to evolve the boron fluoride.

6. In a process of separating an aliphatic organic acid from its complex with a boron-fluorine compound the steps which comprise adding calcium fluoride to the complex, heating the mixture to separate the aliphatic organic acid, and heating the resulting residue more strongly to separate the boron fluorine compound.

7. In a process of separating an aliphatic organic acid from its complex with a boron halide the steps which comprise adding calcium fluoride to the complex, heating the mixture to separate the aliphatic organic acid, and heating the resulting residue more strongly to separate the boron halide.

8. In a process of separating an aliphatic organic ester from its complex with a boron halide the steps which comprise adding calcium fluoride to the complex, heating the mixture to separate the aliphatic organic ester, and heating the resulting residue more strongly to separate the boron halide.

9. In a process of separating acetic acid from its association with boron fluoride by means of calcium fluoride the steps which comprise preparing a mixture of the acetic acid and boron fluoride with the calicium fluoride, heating the mixture to separate the acetic acid, and heating the residue to separate the boron fluoride.

10. In a process of separating an organic compound from its complex with a boron halide the steps which comprise adding an alkaline earth metal halide which preferentially, with respect to the organic compound, forms a complex with the boron halide, separating the organic compound from the resulting solution by distillation, and subsequently separating the boron halide by distillation at a higher temperature.

11. In a process of separating an organic compound from its complex with a boron halide, the steps which comprise adding thereto a metal halide which forms a complex with the boron halide, and subsequently separating the organic compound from the metal halide-boron halide complex.

12. In a process of separating an organic compound from its complex with boron fluoride, the steps which comprise adding thereto a metal halide which forms a complex with the boron fluoride, and subsequently separating the organic compound from the metal halide-boron fluoride complex.

RAYMOND F. SCHULTZ.